US006732161B1

(12) United States Patent
Hess et al.

(10) Patent No.: US 6,732,161 B1
(45) Date of Patent: *May 4, 2004

(54) INFORMATION PRESENTATION AND MANAGEMENT IN AN ONLINE TRADING ENVIRONMENT

(75) Inventors: Martin L. Hess, Aptos, CA (US); Michael K. Wilson, Los Gatos, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,566

(22) Filed: Nov. 9, 1999

Related U.S. Application Data

(63) Continuation of application No. 09/177,726, filed on Oct. 23, 1998, now Pat. No. 6,058,417.

(51) Int. Cl.[7] .............................................. G06F 13/00
(52) U.S. Cl. ..................... 709/219; 709/328; 707/104; 705/27
(58) Field of Search ................................ 709/217, 219, 709/328, 329; 705/26, 27; 707/104; 715/501.1

(56) References Cited

U.S. PATENT DOCUMENTS

| 3,573,747 | A | 4/1971 | Adams et al. |
|---|---|---|---|
| 3,581,072 | A | 5/1971 | Nymayer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,823,265 | A | 4/1989 | Nelson |
| 4,864,516 | A | 9/1989 | Gaither et al. |
| 4,903,201 | A | 2/1990 | Wagner |
| 5,063,507 | A | 11/1991 | Lindsey et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |

(List continued on next page.)

FOREIGN PATENT DOCUMENTS

| CA | 2253543 | 3/1997 |
|---|---|---|
| FR | 2658635 A1 | 6/1991 |

(List continued on next page.)

OTHER PUBLICATIONS

International Search Report, PCT/US01/18225, mailed Sep. 5, 2001.

(List continued on next page.)

Primary Examiner—Viet D. Vu
(74) Attorney, Agent, or Firm—Blakely Sokoloff Taylor & Zafman, LLP

(57) ABSTRACT

A method and apparatus for information presentation and management in an online trading environment are provided. According to one aspect of the present invention, person-to-person commerce over the Internet is facilitated by providing prospective buyers the ability to quickly preview items for sale. Images are harvested from a plurality of sites based upon user-supplied information. The user-supplied information includes descriptions of items for sale and locations from which images that are to be associated with the items can be retrieved. Thumbnail images are created corresponding to the harvested images and are aggregated onto a web page for presentation at a remote site. According to another aspect of the present invention, a user may submit a query to preview items for sale. After receiving the query, thumbnail images corresponding to items that satisfy the user query are displayed, each of the thumbnail images previously having been created based upon a user-specified image.

6 Claims, 12 Drawing Sheets

U.S. PATENT DOCUMENTS

| | | |
|---|---|---|
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,727,165 A | 3/1998 | Ordish et al. |
| 5,737,599 A | 4/1998 | Rowe et al. ............... 395/615 |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,778,367 A | 7/1998 | Wesinger, Jr. et al. ........ 707/10 |
| 5,790,790 A | 8/1998 | Smith et al. |
| 5,794,219 A | 8/1998 | Brown |
| 5,796,395 A | 8/1998 | deHond ..................... 345/331 |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,948,061 A | 9/1999 | Merriman |
| 5,974,412 A | 10/1999 | Hazlehurst et al. |
| 5,986,662 A | 11/1999 | Argiro et al. |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,045,447 A * | 4/2000 | Yoshizawa et al. ........... 465/31 |
| 6,047,264 A | 4/2000 | Fisher et al. |
| 6,055,518 A | 4/2000 | Franklin et al. |
| 6,058,379 A * | 5/2000 | Odom et al. .................. 705/37 |
| 6,058,417 A | 5/2000 | Hess et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,167,382 A | 12/2000 | Sparks et al. ................. 705/26 |
| 6,178,408 B1 | 1/2001 | Copple et al. |
| 6,192,407 B1 | 2/2001 | Smith et al. |
| 6,202,051 B1 * | 3/2001 | Woolston ..................... 705/27 |
| 6,243,691 B1 | 6/2001 | Fisher et al. |
| 6,269,238 B1 | 7/2001 | Iggulden |
| 6,366,899 B1 * | 4/2002 | Kernz .......................... 707/1 |

FOREIGN PATENT DOCUMENTS

| | | | |
|---|---|---|---|
| NL | 9300266 | 10/1993 | |
| WO | WO 92/15174 | 2/1992 | |
| WO | WO 94/22108 | 9/1994 | ............ G06K/9/36 |
| WO | WO 96/34356 | 4/1996 | |
| WO | WO 97/37315 | 3/1997 | |
| WO | WO 98/35468 | 8/1998 | |
| WO | 99/18510 | 10/1998 | |
| WO | WO 99/63461 | 5/1999 | |
| WO | 00/32088 | 4/2001 | |

OTHER PUBLICATIONS

Chris Preist, Marten van Tol, "International Conference on Information and Computation Economies", *Adaptive Agents in a Persistant Shout Double Auction*, (c) 1999, pp. 2.

Malone, TW; Yates, J; et al., "Electrnic Markets and Electronic Hierarchies", *Communications—of the ACM*, Jun. 1987, pp. 484–497, vol. 30, No. 6, USA.

Warbelow, A; Kokuryo, J, "Aucnet: TV Auction Network System". *Harvard Business School Case/Study*, Jul. 1989, pp. 1–15, HBVR# 9–190–001, USA.

"Personal Optimized Decision/Transaction Program", *IBM Technocal Disclosure Bulletin*, Jan. 1995, pp. 83–84, vol. 38, No. 1, USA.

Neo, BS, "The implementation of an electronic market for pig trading in Singapore", *Journal of Strategic Information Sytems*, Dec. 1992, pp. 278–288, Vol 1, No. 5.

Rockoff, TE; Groves, M., "Design of an Internet–based system for remote Dutch auctions", *Internet Reaearch—Electrnic Networking Applications and Policy*, Jan. 1, 1995, Vol 5, No. 4, pp. 10–16.

Massimb, MN; Phelps, BD, "Electronic Trading, Market Structure and Liquifity", *Financial Analysts Journal*, Jan.–Feb. 1994, Vol 50, No. 1, pp. 39–50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 7. vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251–274.

Reck, Martin, "Formally Specifying and Automated Trade Execution System", *Journal of Systems and Software*, 1993, pp. 245–252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363–366, vol. 39, No. 3.

Lee, G., "Electronic Brokerage and Electronic Auction: The Impact of IT on Market Structures", *Proceedings of the 29th HICSS*, 1996, pp. 397–406, vol. IV.

Clemins, E; Weber, B., "Evaluating the Prospects for Alternative Electronic Securities Markets", *International Conference on Information Systems*, 1991, pp. 53–61, Vol 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1–3, vol. 12, No. 42, Ziff–Davis Publishing Company.

"Onsale: Onsale Brings Thrill of Auctions and Bargain Hunting Online; Unique Internet retail service debuts with week–long charity auction for the Computer Museum in Boston", May 24, 1995, pp. 3.

Schmid, BF., "The Development of Electronic Commerce", *Newsletter of the Competence Centre Electrnic Markets*, Oct. 1993, No. 9/10.

Tjostheim, I; EIDE, J., "A case study of an on–line auction for the World Wide Web", *Norwegian Computing Center*, No Date Given, pp. 1–10.

Graham, I., "The Emergence of Linked Fish Markets in Europe", *Focus Theme*, No Date Given, pp. 1–3.

Reck, Martin., "Trasing–Process Characteristics of Electronic Auctions", *Focus Theme*, No Date Given, pp. 1–7.

Van Heck, E; Ribbers, PM., "Experiences with Electronic Auctions in the Dutch Flower Industry", *Focus Theme*, No Date Given, pp. 1–6.

Lee, HG., "Aucnet: Electronic Intermediary for Used–car Transactions", *Focus Theme*, No Date Given, pp. 1–5.

Klein, S., "Introduction to Electronic Auctions", *Focus Theme*, No Date Given, pp. 1–4.

Turban, E., "Auctions and Bidding on the Internet an Assessment", *Focus Theme*, No Date Given, pp. 1–5.

Zwass, Vladimir., "Electronic Commerce: Structures and Issues", *International Journal of Electrnic Commerce*, Fall 1996, pp. 3–23, Vol 1, No. 1.

Auctiva Showcase, downloaded Jan. 15, 2001 from http://www.auctiva.com.

Auction Watch.com, downloaded Jan. 15, 2001 from http://www.auction.com.

Yahoo Auctions Website, downloaded Oct. 23, 1998 from http://auctions.yahoo.com.

Onsale Auction Website, downloaded Oct. 23, 1998 from http://www.onsale.com.

Netgrocer Website, downloaded Oct. 23, 1998 from Website http://www.netgrocer.com.

Auction Universe Website, downloaded Oct. 23, 1998 from http://www.auctionuniverse.com.

European Patent Office Search Report, RS 102472 US, 4 pages.

Hong et al, "Multilingual Information Retrieval System", Multimedia Storage and Archivings Systems, Nov. 18–19, 1996.

Liepins et al, "A Browser Based Image Bank, Useful Tool or Expensive Toy", MEDNET97, Nov., 1997.

Mohan, "Text–Based Search of TV News Stories", Multimedia Storage and Archiving Systems, Nov. 18–19, 1996.

* cited by examiner

| | | |
|---|---|---|
| Home Listings Buyers Sellers Help News/Chat Site Map | | |
| Top : Antiques : Folk Art | | |
| Current Auctions | | |
| Current || New Today || Ending Today || Completed || Going, Going, Gone | | |
| NEW! Vintage handmade paper florals on wood tray PIC | $2.00 | — | 10/26 10:23 |
| NEW! SUPER TRAMP ART 3 STORY BUILDING BOX PIC | $100.00 | — | 10/26 09:44 |
| NEW! Mexican Pottery Vase No. 1 PIC | $5.00 | — | 10/26 09:26 |
| NEW! Mexican Pottery Vase No. 2 PIC | $5.00 | — | 10/26 09:09 |
| NEW! Antique look Xmas Wall Decor "Mittins" PIC | $3.00 | — | 10/26 09:08 |
| NEW! Mexican Pottery Vase No. 3 PIC | $5.00 | — | 10/26 08:57 |
| NEW! Mexican Pottery Vase No. 4 PIC | $5.00 | — | 10/26 08:45 |
| NEW! Hand painted Pottery Wine Jug with Cup PIC | $40.00 | — | 10/26 08:24 |
| NEW! (SUPER!) Folk Art Tucan Head Cane PIC | $49.00 | — | 10/26 08:12 |
| NEW! SCRIMSHAW PIC | $60.00 | — | 10/26 08:09 |
| NEW! Folk Art Hand Carved Light House – Large PIC | $25.00 | — | 10/22 08:41 |
| NEW! Antique Hand Made Adirondak 31" Plant Stand PIC | $9.99 | — | 10/26 07:40 |
| NEW! BUFFALO, MINNESOTA FISH DECOY-red&white PIC | $15.00 | — | 10/26 07:36 |
| NEW! BLACK FOLK ART DOLL- "SHUFFLIN SAM" PIC | $22.00 | — | 10/26 06:52 |
| NEW! HOLY FRIJOLE! TRIPLE KITCHEN VIRGIN APPEARS PIC | $29.00 | 1 | 10/26 06:39 |

For more items in this category, click on the following pages:
= 1 = [2] [3] [4] [5] [6] [7] [8] [9] [10] [11] [12] [13] [14] [15] [16] [17] >>

Top : Antiques : Folk Art

600 eBay  Home  Listings  Buyers  Sellers  Search  Help  News/Chat  Site Map

So many services, so little time! Never fear, the eBay Helpful Services page is here.
Click here for our Halloween Bash!

Sell Your Item

| User ID / Password | User ID or E-mail address ⎯605  Password (forgotten it?) ⎯610 |
| --- | --- |
| Title (no HTML) | (required) ⎯615<br>e.g.: Rare collection of 100 beanie babies |
| Item location | (required) ⎯620<br>e.g.: San Jose, California<br>Please specify the geographic location of the item(s) you are offering. This gives the potential bidder an idea of shipping costs, etc. |

625 Category (choose one category only)   (required)
Try to choose the most specific category, especially for computer-related items Antiques: [           ]   • • •   Books, Movies, Music: [           ]

630

| Accepted Payment Methods (choose as many as apply) | ☐ Money Order/Cashiers Check  ☐ Personal Check  ☐ Visa/MasterCard<br>☐ COD (collect on delivery)  ☐ On-line Escrow  ☐ American Express<br>☒ See Item Description  ☐ Other  ☐ Discover |
| --- | --- |

640

| Shipping Terms | ☐ Seller Pays  ☐ Buyer Pays Fixed Amount<br>☐ Buyer Pays Actual Shipping Costs  ☐ Will Ship Internationally<br>☒ See Item Description |
| --- | --- |

INFORMATION PRESENTATION AND MANAGEMENT IN AN ONLINE TRADING ENVIRONMENT

This is a continuation of application Ser. No. 09/177,726, filed on Oct. 23, 1998, now U.S. Pat. No. 6,058,417.

BACKGROUND OF THE INVENTION

1. Field of the Invention

The invention relates generally to the field of online commerce. More particularly, the invention relates to information presentation and management in an online trading environment, such as an online shopping site, an online auctioning site, an online e-commerce site, an online person-to-person trading site, or the like.

2. Description of the Related Art

More and more Internet users are realizing the ease and convenience of buying and selling online by way of person-to-person online trading pioneered by eBay Inc., the assignee of the present invention. As a result, collectors, hobbyists, small dealers, unique item seekers, bargain hunters, and other consumers, are able to buy and sell millions of items at various online shopping sites.

The success of an online shopping site depends upon its ability to provide an enjoyable shopping experience and an easy-to-use environment in which buyers and sellers can conduct business efficiently. Current online shopping sites have certain limitations in the manner in which they present information to users. With reference to FIG. 1, a typical item listing will briefly be described. A textual list of items 105 representing the results of a user query is presented within a web page format 100 to the user (e.g., a prospective buyer) on his/her computer system. In this example, the web page format 100 presented to the prospective buyer includes items 110 that are currently available for sale on a particular page 170 within a particular category 160. Each item 110 includes a hypertext link 115 having a title (or brief description) of the item for sale, an indication 120 of whether or not an image of the item is available, the current minimum bid 130, the number of bids received 140, and an auction ending time 150. Based upon the item titles, prospective buyers can decide whether or not to view more detailed information on a particular item. In order to view detailed information on a particular item of interest, the buyer is required to select the hypertext link 115 associated with the item. A new page is then presented with more detailed information regarding the item selected. The more detailed information may include, among other things, the item's starting price, a username associated with the seller of the item, a username associated with the current high bidder, a detailed description of the item in text or HTML format, and an image the seller has associated with the item, for example. To continue browsing other items of interest, the prospective buyer must return to the previously viewed listing, using the browser's "Back" function, for instance, and select the hypertext link 115 associated with the next item of interest. While associating an image with an item, such as a digitized picture of the item, has the advantage of allowing the prospective purchaser to make a more informed decision, the iterative process of individually selecting items to view their images can be very time consuming and even frustrating.

In light of the foregoing, it is desirable to provide an improved user interface for online commerce sites. In particular, it would be advantageous to enhance the online trading experience by providing buyers with a mechanism to more quickly preview items for sale. Additionally, the trading experience of sellers may be improved by automating certain aspects associated with item registration.

BRIEF SUMMARY OF THE INVENTION

A method and apparatus for information presentation and management in an online trading environment are described. According to one aspect of the present invention, person-to-person commerce over the Internet is facilitated by providing prospective buyers the ability to quickly preview items for sale. Images are harvested from a plurality of sites based upon user-supplied information. The user-supplied information includes descriptions of items for sale and locations from which images that are to be associated with the items can be retrieved. Thumbnail images are created corresponding to the harvested images and are aggregated onto a web page for presentation at a remote site.

According to another aspect of the present invention, a user may submit a query to preview items for sale. After receiving the query, thumbnail images corresponding to items that satisfy the user query are displayed, each of the thumbnail images previously having been created based upon a user-specified image.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 1 is an example of a prior interface to an online person-to-person trading site that employs text-based item listings.

FIGS. 6A and 6B exemplary form that may be used during item registration.

FIGS. 9A and 9B example of an item presentation format for an online person-to-person trading site according to one embodiment of the present invention.

DETAILED DESCRIPTION OF THE INVENTION

Figure 2:
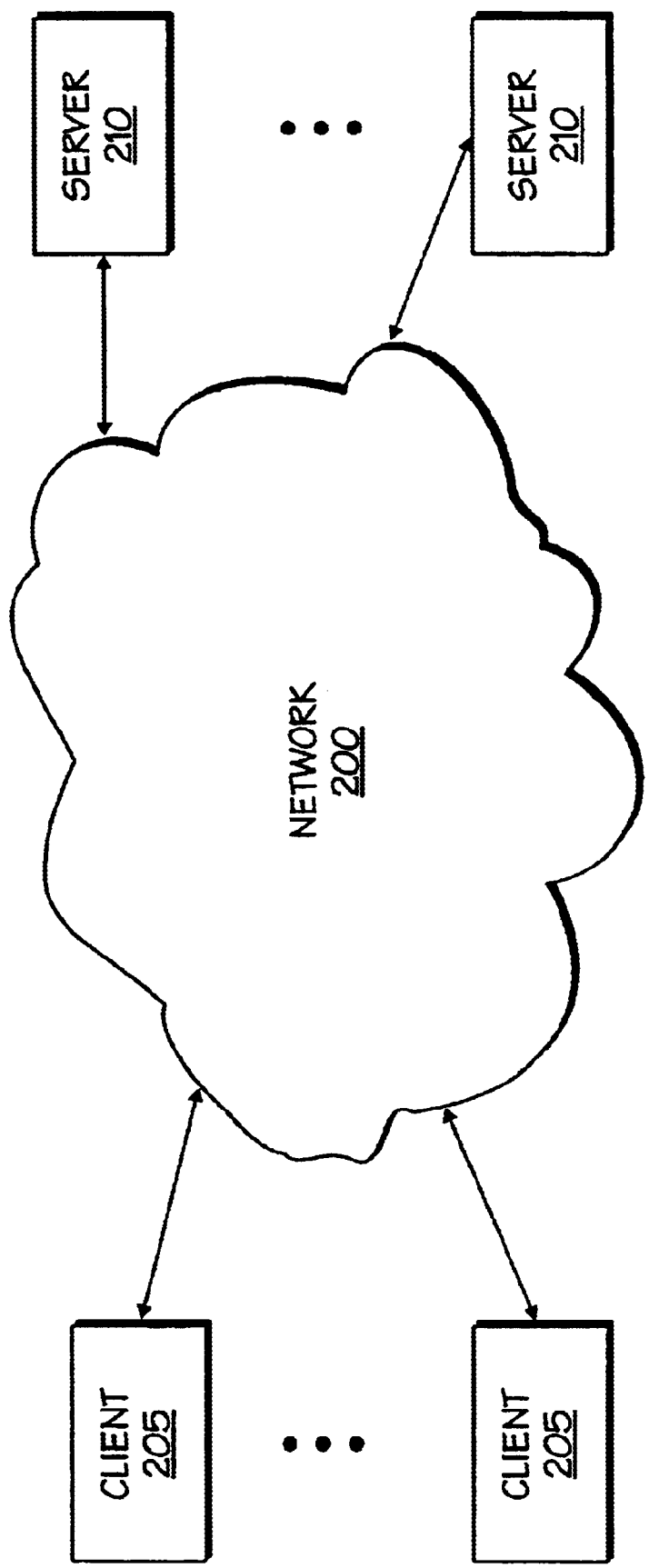
FIG. 2 is a simplified view of an exemplary client-server environment in which online commerce may take place.

A method and apparatus for information presentation and management in an online trading environment are described.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features for enhancing the online trading experience for both buyers and sellers. When sellers register an item for sale, they provide information about the item. For example, the seller may associate a textual description, an image, shipping terms, and other information with the item. Advantageously, according to one aspect of the present invention, to associate an image with an item for sale, the seller is not required to provide the image in a particular format or size; rather, the method and apparatus of the present invention automatically harvest images and transform them to an appropriate format for use with the system. According to another aspect of the present invention, prospective purchasers visiting an online commerce site employing the present invention need not navigate to a separate web page for each item to view images associated with the items; rather, thumbnail images for multiple items are aggregated onto a web page to allow quick preview by the prospective purchaser. In the context of this application, the term "thumbnail" or "thumbnail image" generally refers to a new image that is a miniature version of the original, user-supplied image. Typically, the thumbnail image will be approximately 1 inch×1 inch or smaller. According to one embodiment, thumbnail images are approximately 96 pixels×96 pixels.

In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Importantly, while embodiments of the present invention will be described with respect to an online person-to-person trading environment, the method and apparatus described herein are equally relevant to other applications in which image data is collected from disparate sources and presented to a user and/or other e-commerce environments, such as online shopping sites, auctioning sites, and the like.

Client-Server Environment

FIG. 2 is a simplified view of an exemplary client-server environment, such as the World Wide Web (the Web), in which online commerce may take place. The architecture of the Web follows a conventional client-server model. The terms "client" and "server" are used to refer to a computer's general role as a requester of data (the client) or provider of data (the server). Web clients 205 and Web servers 210 communicate using a protocol such as HyperText Transfer Protocol (HTTP). In the Web environment, Web browsers reside on clients and render Web documents (pages) served by the Web servers. The client-server model is used to communicate information between clients 205 and servers 210. Web servers 210 are coupled to the Internet 200 and respond to document requests and/or other queries from Web clients 205. When a user selects a document by submitting its Uniform Resource Locator (URL), a Web browser, such as Netscape Navigator or Internet Explorer, opens a connection to a server 210 and initiates a request (e.g., an HTTP get) for the document. The server 210 delivers the requested document, typically in the form of a text document coded in a standard markup language such as HyperText Markup Language (HTML).

Exemplary Computer System

Figure 3:
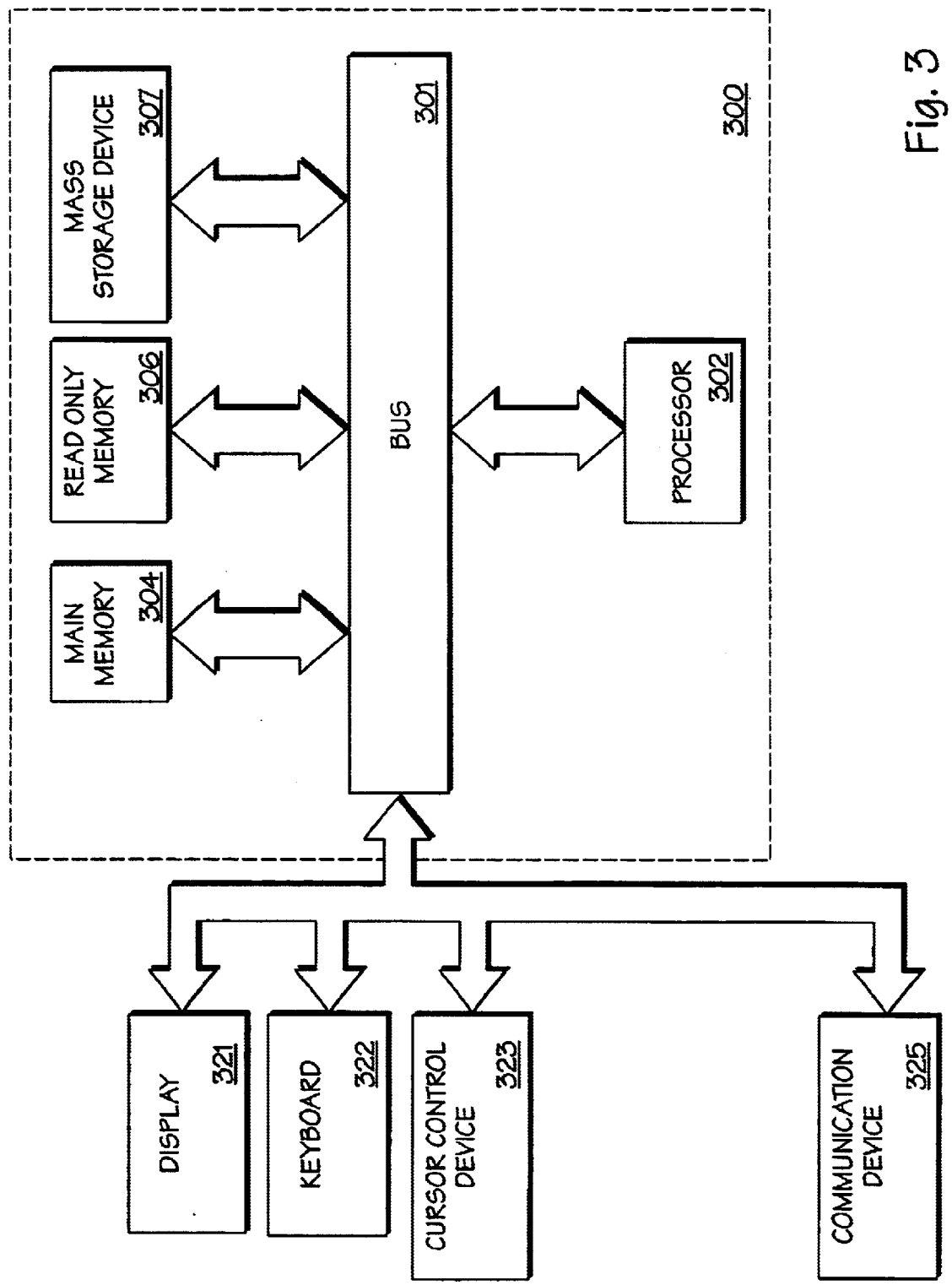
FIG. 3 is an example of a computer system upon which one embodiment of the present invention may be implemented.

A computer system 300 representing an exemplary server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers via the Internet, for example. The communication device 325 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

System Overview

Figure 4:
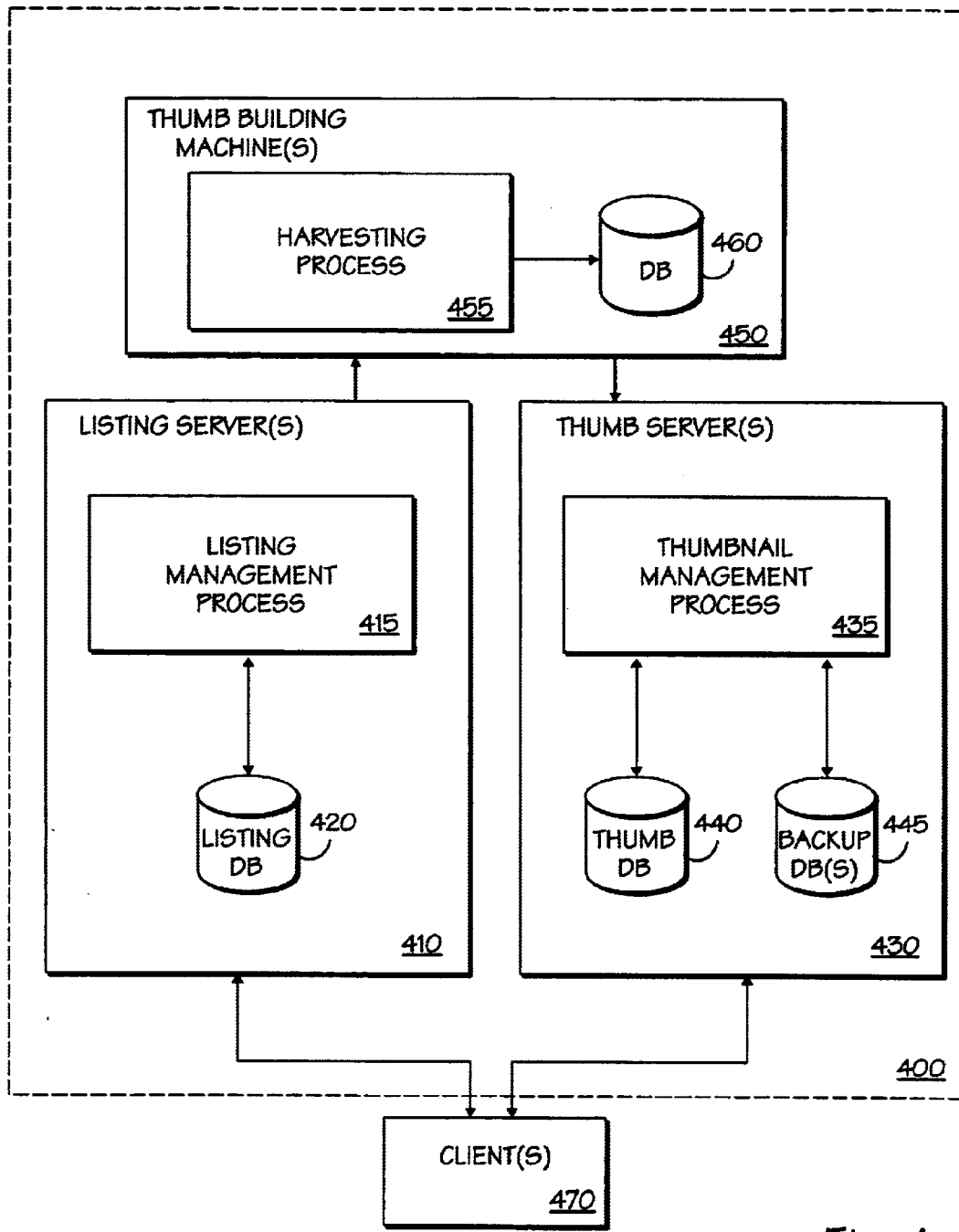
FIG. 4 is a high level illustration of the interaction among various devices according to one embodiment of the present invention.

FIG. 4 is a high level illustration of the interaction among various devices according to one embodiment of the present invention. According to the embodiment depicted, an online commerce site 400 may comprise a listing server 410, a thumb server 430, and a thumb building machine 450. Briefly, the listing server 410 includes a listing management process 415 and a listing database 420. The listing management process interacts with sellers to allow new items to be added to the listing database 420 and with prospective purchasers to provide them with information about items in which they are interested. As will be described further below, the listing management process 415 supports both a text-based item listing format, such as that illustrated in FIG. 1, or a Gallery™ presentation format, such as that illustrated in FIG. 9, that includes thumbnail images of the items for sale (Gallery is a trademark of eBay Inc. of San Jose, Calif.). According to one embodiment, depending on a user-selected mode, e.g., text mode or photo mode, the listing management process 415 provides HTML appropriate for the text-based item listing format or the Gallery presentation format, respectively.

The thumb building machine 450 includes a harvesting process 455 and a database 460. As will be described further below, the harvesting process 455 periodically harvests images that sellers have associated with items in the listing database 420. After a set of images have been harvested and thumbnailed, the harvesting process 455 notifies the thumb server 430 that new thumbnails are available.

The thumb server 430 includes a thumbnail management process 435, a thumb database 440 and one or more backup databases 445. Clients 470 interact with the thumbnail management process 435 to receive image data associated with the Gallery format. When new thumbnails are available, the thumbnail management process 435 makes a backup copy of the current thumb database 440, receives a copy of a new database from the thumb building machine 450, and begins serving thumbnail images from the new database.

Importantly, as one feature of the present embodiment, thumbnail images are not stored as individual files; rather, they are stored in an efficient database format that will be described further below. However, at this point, a justification for such an approach is worth mentioning. In the context of an online commerce site that may processes tens of thousands of new items every day, efficiency and stability are key considerations. The practicality of storing and maintaining thousands upon thousands of individual compressed thumbnail image files is questionable at best. It is thought that existing operating systems would become unstable and/or fail to work properly if millions of thumbnail images were stored in various places on the disk as individual files cluttering the file system. Therefore, rather than maintaining a complex file structure with potentially millions of separate files, according to one embodiment of the present invention an efficient database is maintained that is designed to get information into memory quickly to provide fast access to the thumbnail images stored therein.

Note that in this description, in order to facilitate explanation, the thumb building machine 450, the listing server 410, and the thumb server 430 are generally discussed as if they were each a single device. However, each of the thumb building machine 450, the listing server 410, and the thumb server 430 may actually comprise multiple physical and/or logical devices connected in a distributed architecture, and the various functions performed may actually be distributed among multiple devices. Additionally, in alternative embodiments, the functions performed by the various servers may be consolidated and/or distributed differently than as described. For example, any function can be implemented on any number of machines or on a single machine. Also, any process may be divided across multiple machines.

Item Maintenance

Figure 5:
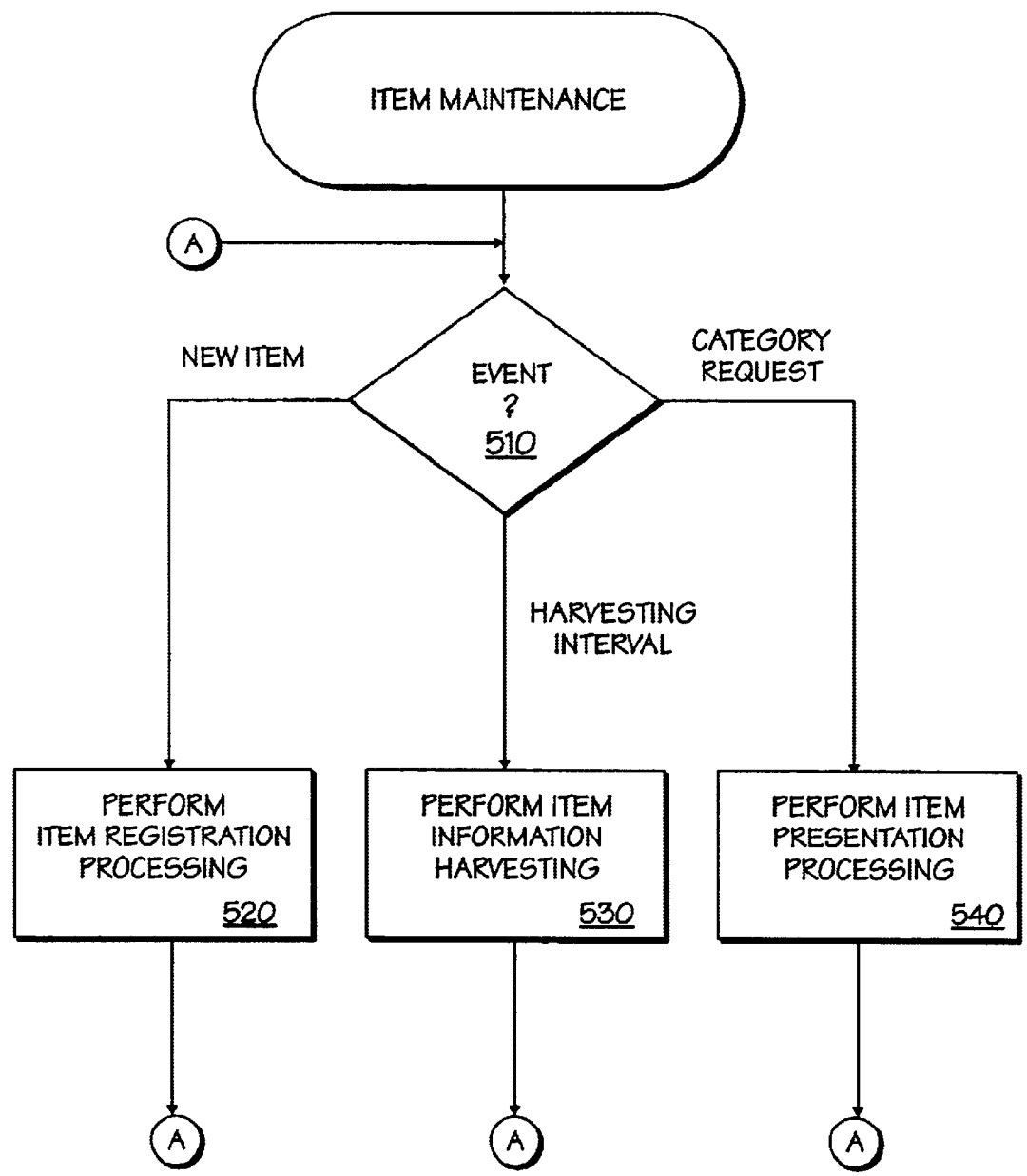
FIG. 5 conceptually illustrates high level item maintenance processing according to one embodiment of the present invention.

Having briefly described exemplary interactions among various devices in which features of the present invention may be implemented, item maintenance processing will now be described with reference to FIG. 5. In general, item maintenance comprises three activities: creating and modifying items, harvesting images to be associated with the items, and presenting items to prospective buyers.

At step 510, depending upon user interactions with the various servers, appropriate processing is performed. If a user request is received to add a new item, then processing continues with step 520. If a user query is received, e.g., a query specifying a category and a page, then processing continues with step 540. Various events may also trigger item maintenance processing. For example, according to the embodiment illustrated, upon expiration of a predetermined harvesting interval, processing continues with step 530. In alternative embodiments, harvesting may be performed on a periodic basis or continuously.

Figure 6B:
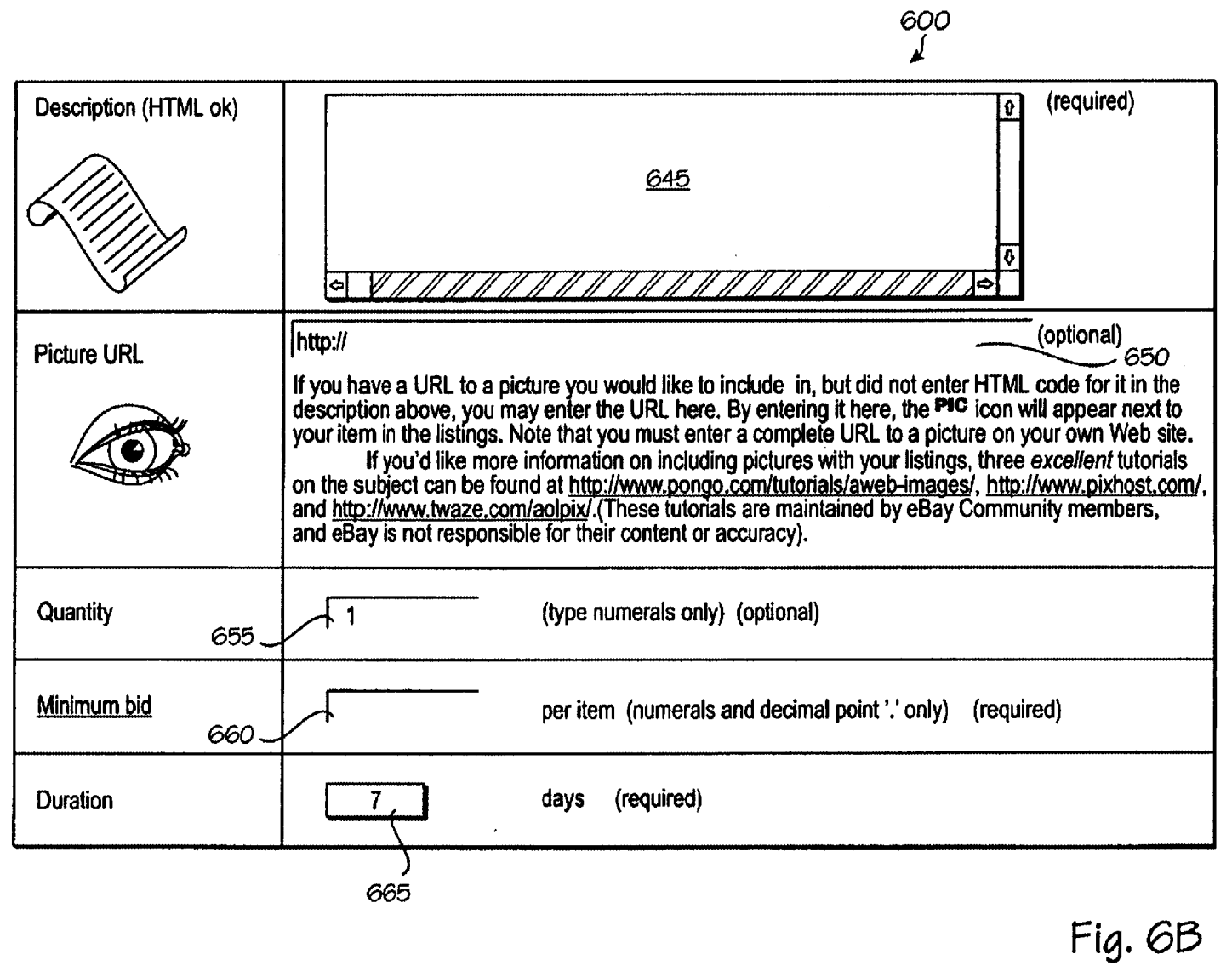

At step 520, item registration processing is performed. According to one embodiment, an HTML form, such as the one illustrated in FIG. 6, is supplied to the user. When the completed form is submitted to the listing server 410, the listing management process 415 updates the listing database 420 to include the new item.

At step 530, the harvesting process 455 downloads user-specified images associated with newly listed items to its local database 460. New items may be identified, for example, by a periodic scan of the listing database by either of the listing management process 415 or the harvesting process 455. The harvesting process 455 may also periodically reload images and update thumbnails associated with items that are not new to accommodate subsequent user modification. For example, a user may change the originally specified image or provide a new URL to be associated with an item for sale. Further details regarding harvesting are described below.

Figure 9A:
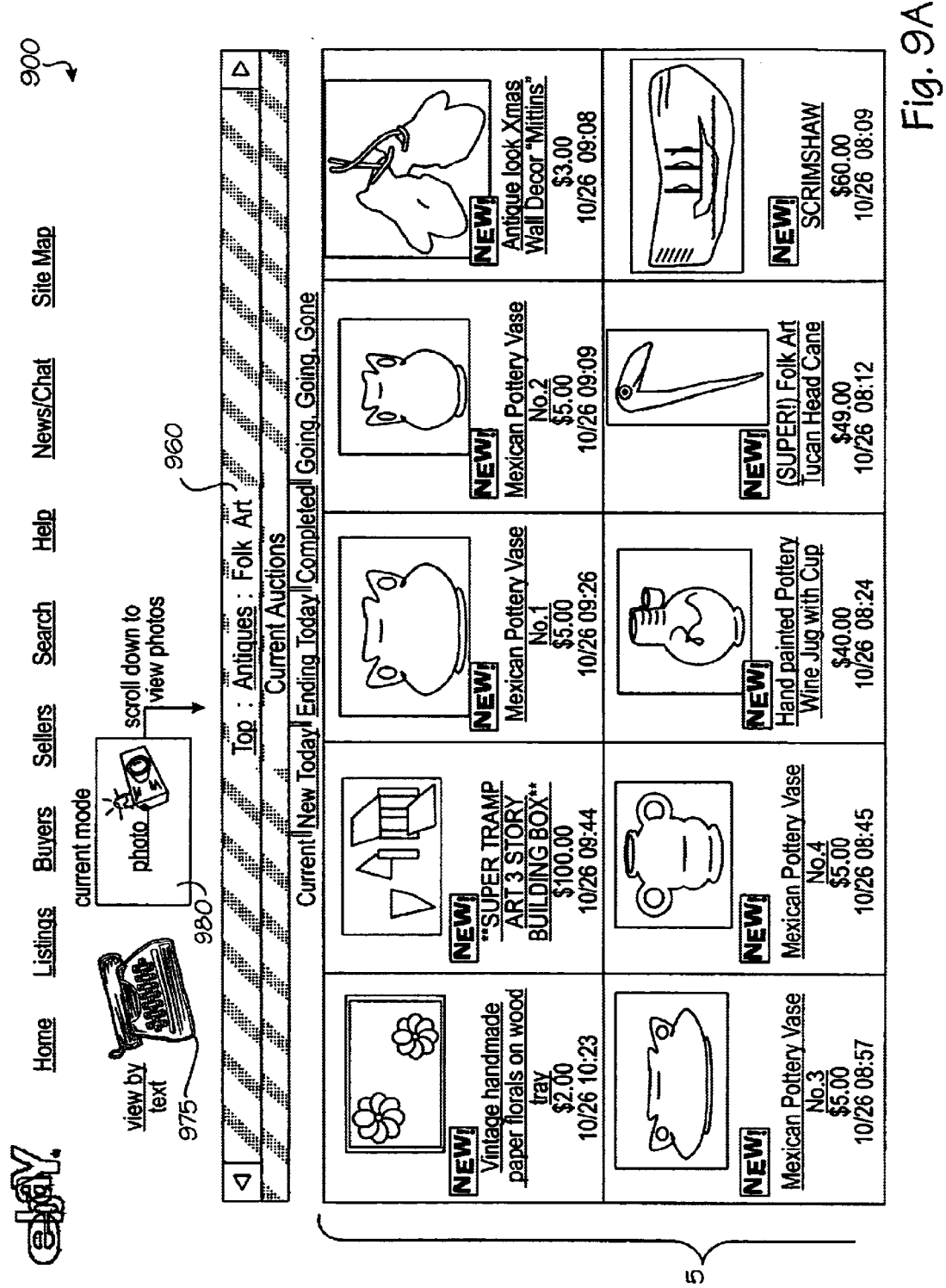
Figure 9B:
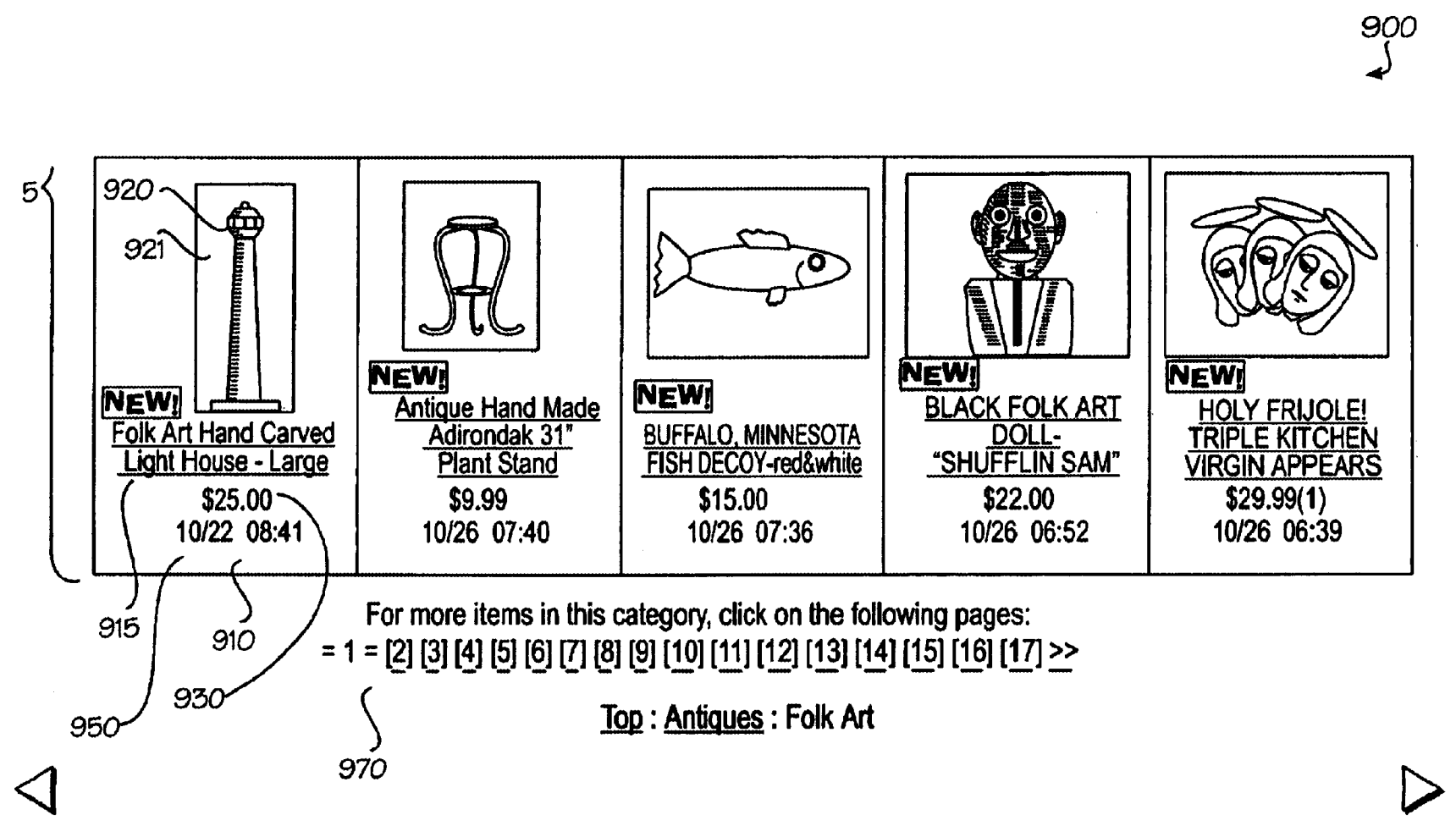

At step 540, item presentation processing is performed. According to one embodiment responsive to a user request, e.g., a query specifying a category and a page number, the listing management process 415 generates HTML describing to the user's browser how to gather and compose the web page. As will be described further below, the HTML may contain image tags referencing thumbnail images stored in the thumb database 440. An exemplary Gallery format, an item presentation format that incorporates thumbnails for fast preview, is illustrated in FIG. 9.

Item Registration

FIG. 6 is an exemplary registration form 600 that may be used during item registration. To sell an item on an online commerce site, typically the seller first registers the item to be sold. In this context, the act of registering simply refers to the process of supplying information about the item so that the information may be presented to prospective purchasers responsive to their requests and/or queries.

Upon receiving a request to add a new item, the listing management process 415 may respond with an HTML form, such as registration form 600. The registration form 600 may include a variety of standard HTML form interface elements, including text input fields, checkboxes, radio buttons, and popup menus, for example. The most important piece of information for purposes of this application is the picture URL 650. The picture URL 650 text input field allows a seller to specify an image of his/her choice to be associated with the item being registered. Note, that no additional information regarding the image is necessary. Advantageously, in this manner, the user need not worry about supplying an image in a particular format or one that is limited to a particular size. As will be described further below, the harvesting process 455 automatically downloads the specified image, converts it to the appropriate format, and scales it to the appropriate size that is appropriate for use with the Gallery presentation mechanism.

The seller also provides his/her user ID or email address 605 and a password 610 in form 600. According to this example, the seller additionally submits a descriptive title 615 for the item and a geographical location 620 of the item. Providing the location 620 of the item allows prospective buyers to evaluate potential costs relating to shipping, etc. In order for the item to show up in user queries for a particular category, the seller also selects one of a number of categories 625 and chooses the most specific sub-categories from a predefined list in a popup menu, for example. Finally, the seller may specify acceptable payment methods 630, shipping terms 640, the quantity 655 of items of this type that are available, a minimum bid 660 per item, and the duration 665 of the offer. When the item is posted to the listing database 420 a unique item number is generated and associated with the item. The item numbers may be sequentially numbered as new items are posted to the listing database 420, for example.

The present invention is not limited to any particular implementation of registration processing or to the specific information that may be associated with an item for sale. Importantly, the registration form 600 is intended only to illustrate some of the many types of information that may be associated with an item that is posted to the listing database 420. In alternate embodiments, more or less information may be associated with items.

Image Harvesting

Figure 7:
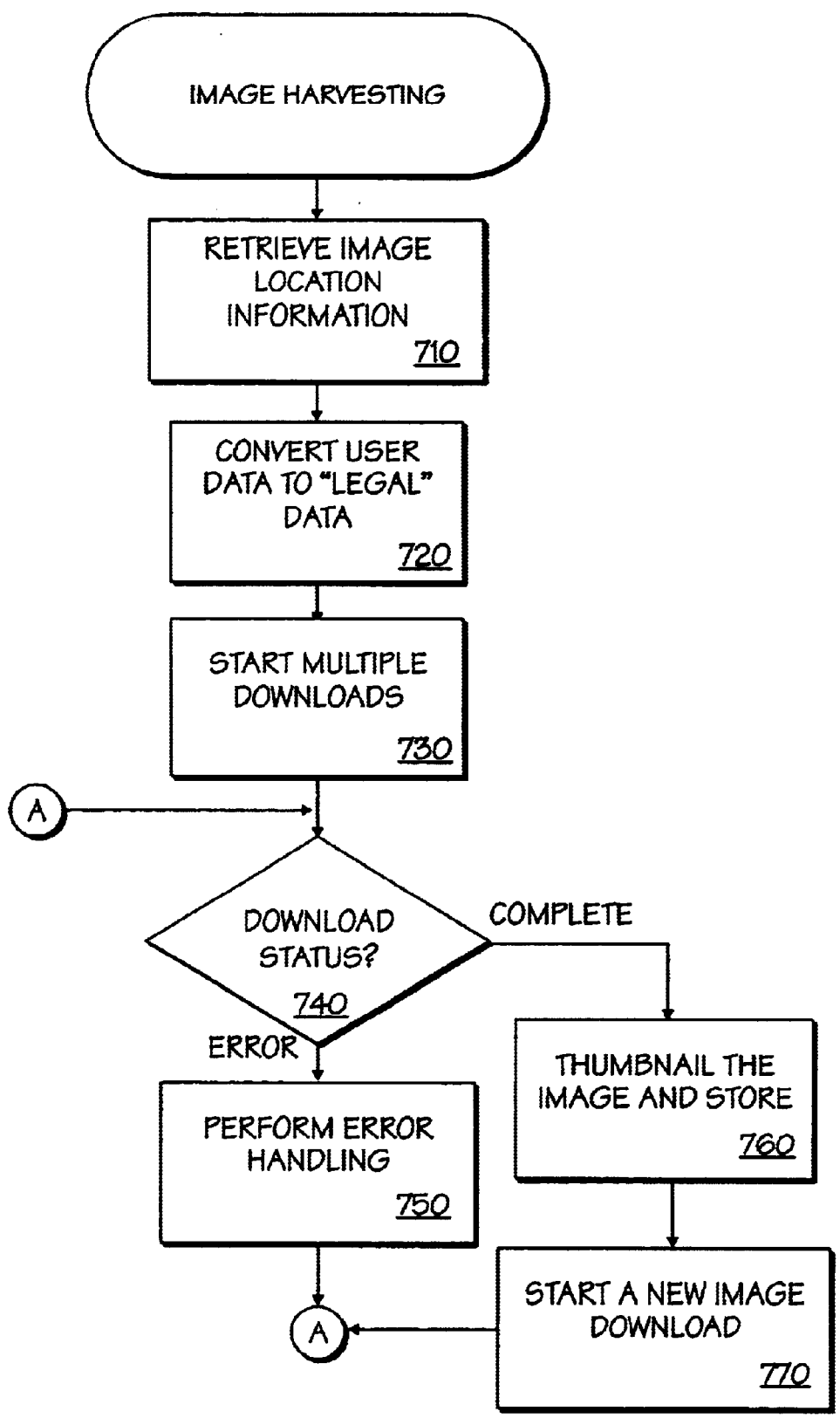
FIG. 7 is a flow diagram illustrating image harvesting processing according to one embodiment of the present invention.

FIG. 7 is a flow diagram illustrating image harvesting processing according to one embodiment of the present invention.

At step 710, image location information is retrieved from the listing database 420 for a set of images that will be downloaded concurrently. According to one embodiment, the image location information is a URL. However, other mechanisms are envisioned for specifying an image location, such as a directory path, etc.

At step 720, an attempt is made to convert erroneous user-supplied data to "legal" data. For example, the user-supplied data for the image location may be massaged to have correct URL syntax. URLs follow the syntax described in Request for Comments (RFC) 1738, Uniform Resource Locators (URL), December 1994. According to RFC 1738, a URL contains the name of the "scheme" being used (e.g., http, ftp, gopher, etc.) followed by a colon and then a string, the "scheme-specific part" whose interpretation depends on the scheme. URLs are, therefore, written as follows:

<scheme>:<scheme-specific part>

For example, the eBay home page is currently located at the following URL: "http://www.ebay.com". The scheme is "http" and the scheme-specific part is "www.ebay.com".

At step 730, multiple image downloads are started using a sockets-based interface. Prior to starting the downloads, it may be necessary to attempt a variety of option configurations in order to establish communication with a particular server.

At any rate, assuming communication has successfully been established with the servers that have the desired image data, in one embodiment, 500 downloads are performed concurrently. After the downloads have begun, the status of the downloads is polled periodically (step 740). If an error arose in one or more of the downloads, processing continues with step 750. If one or more of the downloads has completed, then processing continues with step 760.

At step 750, error handling is performed. Attempts may be made to determine whether or not an error has in fact occurred. For example, it is not uncommon for a server to incorrectly identify a file size thereby causing a mismatch between the actual size of the downloaded file and the expected file size. In situations like these, the image can be salvaged; however, other situations may require the download to be restarted.

At step 760, the one or more images that have been downloaded successfully are thumbnailed and stored for later inclusion in the thumbnail database 440. According to one embodiment, the process of thumbnailing an image is performed with an imaging tool kit, such as ImageGear98 Gold Pro of Accusoft. Thumbnailing an image may be broken down into three steps: (1) first, decompression is performed from the harvested image's source format; (2) then, the decompressed image is converted to a thumbnail that will fit within a predetermined space. For example, the largest dimension of the source image may be scaled to fit the corresponding dimension of the predetermined space, then the other dimension of the source image may be scaled proportionately; (3) finally, the thumbnail is recompressed into a predetermined output format, e.g., Joint Photographics Expert Group (JPEG).

Preferably, for convenience of the users, the thumbnailing process may receive one of many different image formats. According to one embodiment, the source format and the output format are one of the following: Tagged Image File Format (TIFF), JPEG, JPEG 12Lossy, JPEG 12-8 Lossless, P-JPEG, Audio Video Interleave (AVI), (JPEG File Interchange Format) JFIF, Delrin Winfax, PCX (ZSoft Paint format), TGA (Truevision (Targa) File Format), Portable Network Graphics (PNG), DCX, G3, G4, G3 2D, Computer Aided Acquisition and Logistics Support Raster Format (CALS), Electronic Arts Interchange File Format (IFF), IOCA, PCD, IWF, ICO, Mixed Object Document Content Architecture (MO:DCA), Windows Metafile Format (WMF), ATT, Windows Bitmap Format (BMP), BRK, CLP, LV, GX2, IMG(GEM), IMG(Xerox), IMT, KFX, FLE, MAC, MSP, NCR, Portable Bitmap (PBM), Portable Greymap (PGM), SUN, PNM, Portable Pixmap (PPM), Adobe Photoshop (PSD), Sun Rasterfile (RAS), SGI, X BitMap (XBM), X PixMap (XPM), X Window Dump (XWD), AFX, Imara, Exif, WordPerfect Graphics Metafile (WPG), Macintosh Picture (PICT), Encapsulated PostScript (EPS), Graphics Interchange Format (GIF). Of course, as new image formats are introduced, it would be advantageous to provide support for those as well.

Item Presentation

Figure 8:
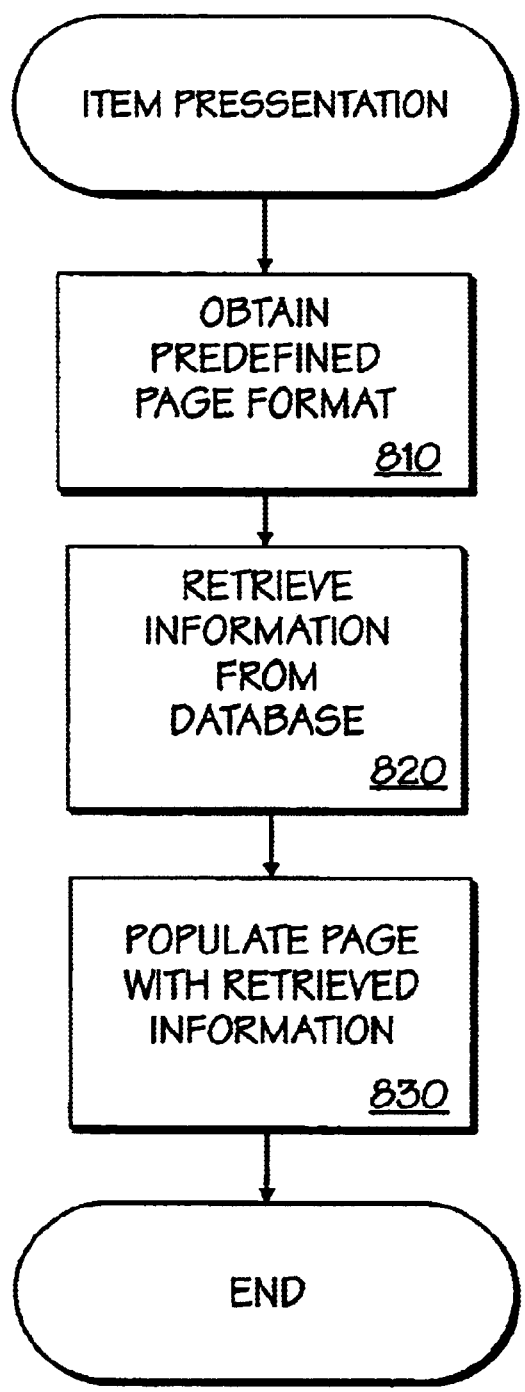
FIG. 8 is a flow diagram illustrating item presentation processing according to one embodiment of the present invention.

FIG. 8 is a flow diagram illustrating item presentation processing according to one embodiment of the present invention. The assignee of the present invention has observed that in the context of item presentation only a small amount of information actually needs to be changed in the HTML that is generated for various user queries. For an item presentation format, such as that illustrated in FIG. 9, the information that varies is essentially limited to: the item title, the current minimum bid, the image, and the auction ending time. The remainder of the web page comprises HTML interface elements that remain constant regardless of the result of the user's query. Consequently, according to one embodiment, a predefined page format (referred to as the Gallery template) is employed into which the information that varies can be inserted on the fly as data is retrieved from the databases.

At step 810, the predefined page format, e.g., the Gallery template, is obtained.

At step 820, the listing management process 415 retrieves information from the listing database 420 corresponding to the items that will be displayed for the category and page requested, for example.

At step 830, the predefined page format is populated based upon the information retrieved in step 820. At this point, it should be noted that according to one embodiment of the present invention, thumbnail images are accessed from the thumb server 430 by item number. As one feature of this embodiment, references to the thumbnail images stored on the thumb server 430 may be generated on the fly by the listing management process 415 based upon the image format and the item number. For example, an inline image tag can be generated having the general form: <img src=path/item_numberjpg>. In this manner, no additional space is required in the listing database 420 for image file names. Another option would have been to represent the image reference in the form of a query, e.g., http://cgi.ebay.com/cgi/DBAPI.dll?GetImage&item=item_number. However, while the former representation would be cached by caching proxy servers, the latter representation is not typically cached by caching proxy servers. Therefore, hiding the underlying queries to the thumb database 440 from caching proxy servers by representing the thumbnail images in the HTML as if they were stored as individual files has the benefit of causing the caching proxy servers to perform more efficiently thereby generally reducing the load on the site and making the experience better for all users. Additionally, users that access the listing server 410 and the thumb server 430 by way of a caching proxy server, such as those on America Online, for example, will have enhanced performance as a result of the thumbnail images being cached because the data for rending the web pages will be available much faster.

Gallery Presentation Format

FIG. 9 is an example of an item presentation format for an online person-to-person trading site according to one embodiment of the present invention. The Gallery presentation page format 900 of the present embodiment includes a text mode button 975 and a photo mode button 980 allowing the user to switch between the text-based item listing format and the Gallery presentation format. In response to a user query, such as a request for a particular page 970 within a particular category 960, a list of items 905 is displayed to the users. In this example, each individual item 910 includes a thumbnail image 920, a title 915, a current minimum bid 930, and the auction ending time 950. Advantageously, in this manner, the Gallery presentation page format 900 allows a prospective buyer to quickly scan the thumbnails for items of interest. Such a feature becomes critical in an online commerce environment in which thousands of unique items are for sale, for example.

According to another feature of the present embodiment, by displaying all images in a predetermined, fixed-size display area 921, the listing management process 415 doesn't need to have detailed knowledge about the individual images. For example, according to an embodiment described previously, the listing management process 415 can simply use the item number to generate references, e.g., inline image tags, for the desired thumbnail images.

Thumb Database Access

Figure 10:
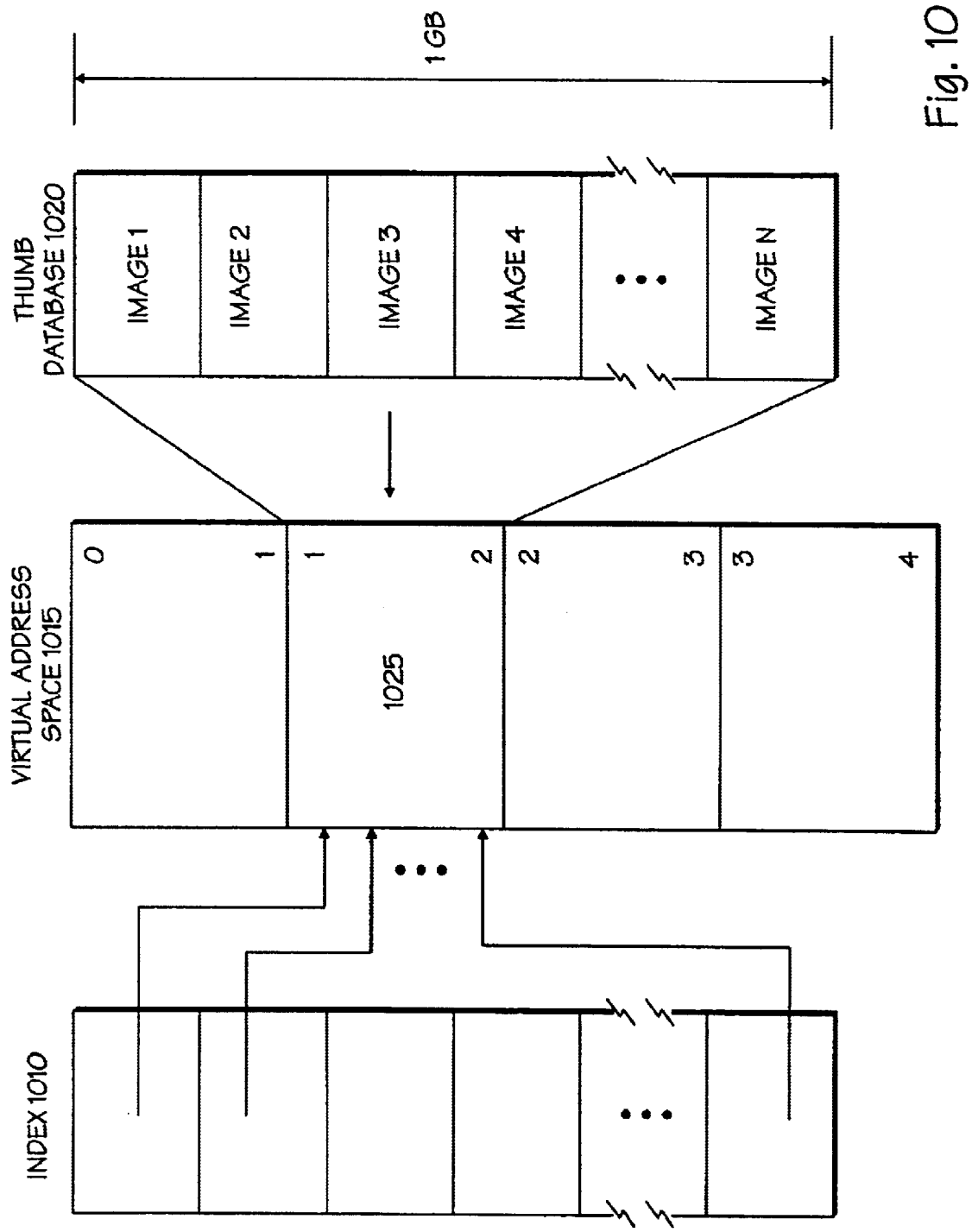
FIG. 10 illustrates memory mapped file access to the thumb database according to one embodiment of the present invention.

FIG. 10 illustrates memory mapped file access to the thumb database 1020 according to one embodiment of the present invention. According to the embodiment depicted, rather than maintaining a complex file structure with potentially millions of separate files, a simple and efficient thumb database 1020 is maintained that is designed to get information into memory quickly to provide fast access to the thumbnail images stored therein. Briefly, the goal is to keep the thumb database 1020 reasonably sized so that it can be completely loaded into a virtual address space 1015 and accessed as a memory mapped file.

According to one embodiment, each database entry comprises a length field and image data. The length field may identify the length of the entry or the length of the image data. The image data represents the compressed thumbnail image. For purposes of this example, it is assumed the thumb server has a 4 Gigabyte virtual address space and that the thumb database 1020 can be compressed into a single 1 Gigabyte file. When the thumbnail management process 435 opens the thumb database 1020 for reading; rather than using file system calls that would not provide sufficient caching, it opens the thumb database 1020 as a memory mapped file. As a result, the thumb database is loaded completely into a continuous block 1025 of the virtual address space 1015. Accessing an individual entry of the database may then be accomplished by selecting an offset corresponding to the desired image from an array of relative offsets, such as index 1010. Advantageously, after the thumb database 1020 is loaded into virtual address space 1015, disk I/O can be avoided for subsequent accesses thereby enhancing the speed at which images can be served to clients.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of facilitating person-to-person commerce over a network, the method comprising:

harvesting user-specified images to be associated with items for sale from a plurality of sites based upon user-supplied information, the user-supplied information including descriptions of the items for sale and locations from which the user-specified images to be associated with the items can be retrieved;

creating thumbnail images corresponding to the harvested user-specified images; and aggregating the thumbnail images onto a web page for presentation at a remote site.

2. The method of claim 1, wherein said creating thumbnail images corresponding to the harvested user-specified images comprises:

for each harvested user-specified image decompressing the harvested user-specified image from a source format to a decompressed image format;

converting the decompressed image format to a thumbnail image format; and compressing the thumbnail image format into an output format.

3. The method of claim 2, wherein the source format comprises at least one of the following image formats: Tagged Image File Format (TIFF), Joint Photographics Expert Group (JPEG), Audio Video Interleave (AVI), JPEG File Interchange Format (JFIF), Portable Network Graphics (PNG), Windows Bitmap Format (BMP), Portable Bitmap (PBM), Portable Greymap (PGM), Portable Pixmap (PPM), Adobe Photoshop (PSD), X BitMap (XBM), X PixMap (XPM), WordPerfect Graphics Metafile (WPG), and Macintosh Picture (PICT).

4. The method of claim 2, wherein the output format comprises at least one of the following image formats: Tagged Image File Format (TIFF), Joint Photographics Expert Group (JPEG), Audio Video Interleave (AVI), JPEG File Interchange Format (JFIF), Portable Network Graphics (PNG), Windows Bitmap Format (BMP), Portable Bitmap (PBM), Portable Greymap (PGM), Portable Pixmap (PPM), Adobe Photoshop (PSD), X BitMap (XBM), X PixMap (XPM), WordPerfect Graphics Metafile (WPG), and Macintosh Picture (PICT).

5. The method of claim 1, wherein the locations are specified by Uniform Resource Locators (URLs), and wherein the harvesting of the user-specified images from the plurality of sites based upon user-supplied information comprises downloading the user-specified images from the plurality of sites specified by the URLs.

6. A method of facilitating person-to-person commerce over a network, the method comprising:
- harvesting user-specified images to be associated with items for sale from a plurality of sites based upon user-supplied information, the user-supplied information including descriptions of the items for sale and locations from which the user-specified images to be associated with the items can be retrieved;
- creating thumbnail images corresponding to the harvested user-specified images, each of the thumbnail images having an associated item number corresponding to an item for sale;
- retrieving thumbnail images by corresponding item numbers; and
- aggregating the thumbnail images onto a web page for presentation at a remote site.

* * * * *